United States Patent [19]

Kralowetz et al.

[11] 4,208,156

[45] Jun. 17, 1980

[54] MACHINE FOR MACHINING CRANKPINS OF A MULTIPLE-THROW CRANKSHAFT

[75] Inventors: Bruno Kralowetz; Gottfried Blaimschein, both of Steyr, Austria

[73] Assignee: GFM Gesellschaft fü Fertigungstechnik und Maschinenbau Aktiengesellschaft, Steyr, Austria

[21] Appl. No.: 889,632

[22] Filed: Mar. 24, 1978

[30] Foreign Application Priority Data

Apr. 18, 1977 [AT] Austria .................. 2679/77

[51] Int. Cl.² .................. B23C 3/06; B23B 5/18
[52] U.S. Cl. .................. 409/165; 82/9; 409/200
[58] Field of Search .................. 90/11 C, 11 R, 20; 51/73 GC, 105 EC, 327; 82/9, 20; 409/131, 199, 200, 197, 198, 203, 219, 165, 168

[56] References Cited

U.S. PATENT DOCUMENTS

| 2,126,462 | 8/1938 | Groene et al. | 82/9 X |
| 3,793,687 | 2/1974 | Berbalk | 90/11 C |
| 3,880,025 | 4/1975 | Kralowetz et al. | 82/9 |
| 4,099,431 | 7/1978 | Kreucher | 409/198 |
| 4,157,055 | 6/1979 | Marzy | 409/199 |

FOREIGN PATENT DOCUMENTS

| 691271 | 4/1940 | Fed. Rep. of Germany | 82/9 |
| 867259 | 5/1961 | United Kingdom | 82/9 |
| 516476 | 6/1977 | U.S.S.R. | 409/199 |

*Primary Examiner*—William R. Briggs
*Attorney, Agent, or Firm*—Kurt Kelman

[57] ABSTRACT

In a process of milling a multiple-throw crankshaft comprising mainshaft portions and crankpins in alternation, two outer crankpins of three axially consecutive crankpins are milled at the same time while the crankshaft is supported at its ends and at the mainshaft portions which connect said three crankpins.

2 Claims, 1 Drawing Figure

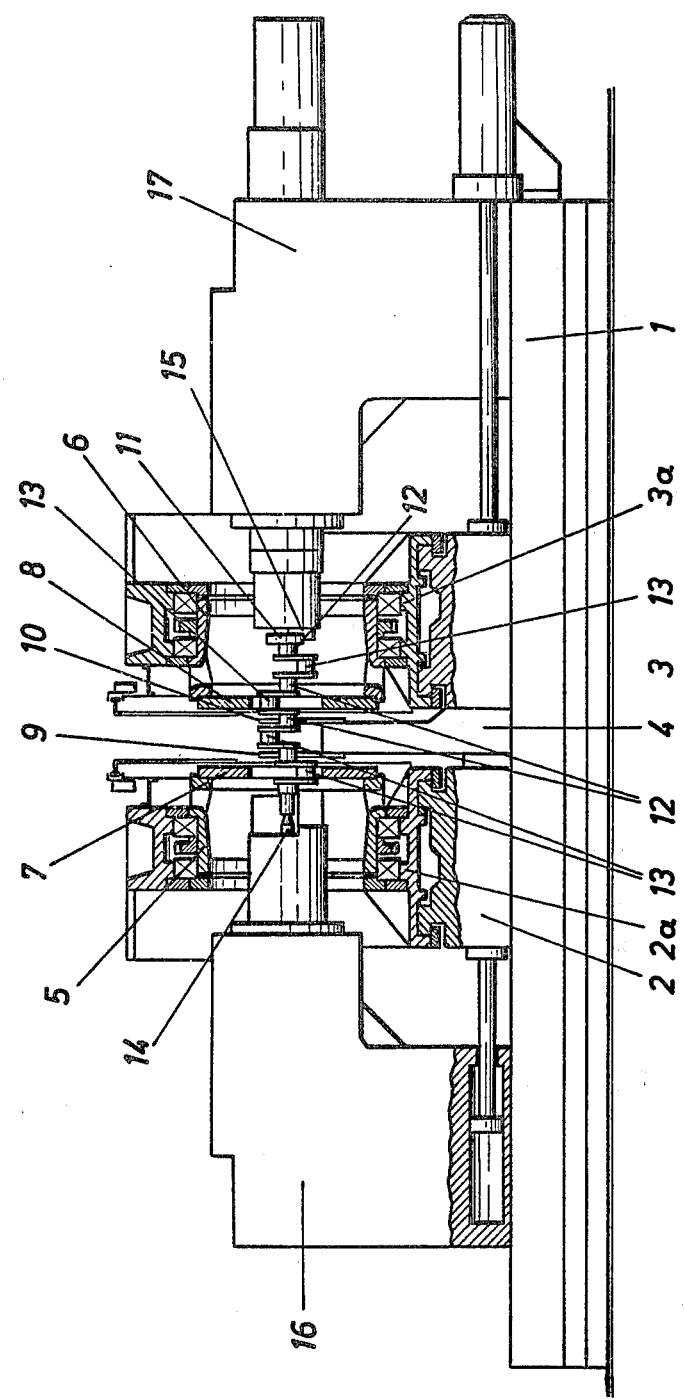

MACHINE FOR MACHINING CRANKPINS OF A MULTIPLE-THROW CRANKSHAFT

This invention relates to a process of milling the crankpins of multiple-throw crankshafts, preferably four-throw crankshafts, which comprise alternating mainshaft portions and crankpins, which process comprises a simultaneous machining of two crankpins disposed on opposite sides of an additional support for the mainshaft, and to a milling machine for carrying out the process.

Particularly in the manufacture of multiple-throw crankshafts in large quantities, e.g., in the series production of four-throw crankshafts for passenger car engines, a milling operation which is carried out with high precision and at high speed is essential. In a known process, the crankpins are milled not only one after the other but also in pairs in an arrangement in which the middle mainshaft portion is additionally supported by a stay and the crankpins are machined in a sequence which proceeds from said stationary fixing means toward the ends of the crankshaft. Whereas that process enables a simultaneous milling of two crankpins so that the milling time is reduced to one-half, the single central stay used as a support during the milling in a sequence which proceeds from the stay toward the ends of the crankshaft cannot adequately support the workpiece because the distance from the milling tools to the stay increases progressively as successive crankpins are milled. Besides, the tool carriages must be moved so close to the central stay during the simultaneous milling of the two crankpins which are next to the middle mainshaft portion that there is no space for an adequate stay and the workpiece is not properly supported.

In another known process of milling crankshafts the mainshaft portions and crankpins are machined in succession in a single operation proceeding from one end of the crankshaft to the other and the crankshaft being milled at a given portion is gripped at a previously machined portion. To increase the speed of that milling process, two crankshaft portions consisting of a mainshaft portion and a crankpin can be milled at the same time. In that case the crankpin is disposed behind and the mainshaft portion is disposed in front of the portion at which the crankshaft is gripped. That progressive operation in which the crankshaft is gripped at a mainshaft portion which has just been milled so that said mainshaft portion determines the precision with which the next mainshaft portion is milled inherently involves certain inaccuracies. Besides only a small space between the milling tools is available for means for gripping the intervening mainshaft portion so that only inadequate, narrow devices can be used as additional gripping means.

For these reasons, the known processes and machines for milling crankshafts which enable a reduction of the machining time involve a loss of dimensional accuracy so that an undesired compromise between quality and quantity performance is required.

It is an object of the invention to eliminate these disadvantages and so to improve a process of the kind described first hereinbefore that crankpins can be made to smaller tolerances within the same time or even in a shorter time. Besides, a simple and suitable milling machine for carrying out the process is to be disclosed.

In the process according to the invention, a pair of crankpins which are the two outer ones of three axially consecutive crankpins, are milled at the same time and the crankshaft is supported at both mainshaft portions which connect said three crankpins. In this way, two crankpins can be milled at the same time and the crankshaft can be supported at a portion which directly adjoins each crankpin being machined. The space between the crankpins which are milled at the same time has a length which is equal to the lengths of two mainshaft portions and one crankpin and the thickness of the intervening crankwebs so that a fully satisfactory support for the two mainshaft portions can be accommodated in said space. This arrangement ensures that the cutting pressures are always taken up satisfactorily so that milling can be performed with high precision.

In the process according to the invention, pairs of crankpins are preferably milled in a sequence which proceeds from one end of the crankshaft to the other.

To enable a proper performance of this time-saving process of milling the crankpins of multiple-throw crankshafts to small tolerances, a milling machine comprising two tool carriages, each of which carries an annular milling tool having inwardly directed cutting teeth, and also comprising a stay disposed between the longitudinal carriages which carry the tool carriages, is provided with two longitudinally spaced apart supports for radially supporting the crankshaft at two mainshaft portions which are adjacent to each other and the milling tools are adapted to mill two crankpins at the same time which are disposed on opposite sides of the two mainshaft portions supported by the supports and of the intervening crankpin. If the axial length of each mainshaft portion is at least as large as the axial length of each crankpin, the arrangement may be such that the supports have the same center distance as the mainshaft portions of a crankshaft to be machined and the longitudinal carriages and the stay can be approached to each other so that the center distance between each milling tool and the adjacent support equals the center distance between a crankpin and an adjacent mainshaft portion of a crankshaft which is to be machined. In that case the two longitudinal carriages and the intervening stay of such milling machine can be coupled to each other by suitable means so that the milling tools and the supports will be automatically associated with the mainshaft portions and crankpins of a crankshaft in the manner which is required for the performance of the process according to the invention. When the parts of this machining unit are displaced in unison, even multiple-throw crankshafts can be milled exactly and with a low control expenditure. Assuming that the crankpins are consecutively numbered from one end of the crankshaft to the other in the direction of the working sequence, the crankpins are machined in successive pairs 1, 3; 2, 4;, 5, 7;, 6, 8; etc. During the machining of a given pair of crankpins, the crankshaft is supported or gripped at the mainshaft portions disposed between the crankpins being machined and the intervening crankpin. The stay provided with two supports which can be adjusted and operated in unison performs the functions of a dual stay with the expenditure of a single stay and adequate is provided for a fully satisfactory support of the workpiece.

The accompanying drawing is a side elevation showing partly in section an illustrative embodiment of a milling machine according to the invention.

Two longitudinal carriages 2, 3 and an intervening stay 4 are longitudinally slidably mounted on a machine bed 1. Cutter carriages 2a, 3a are slidable on the longitudinal carriages 2, 3 in a direction which is transverse to the machine axis and carry driven tool drums 5, 6, respectively, each of which carries an annular milling tool 7 or 8, which has inwardly directed cutting teeth. The stay 4 is provided with two supports 9, 10. A four-throw crankshaft 11 which is to be milled and has alternating mainshaft portions 12 and crankpins 13 is gripped in chucks 14, 15 carried by two gripping heads 16, 17, respectively. The gripping head 16 is adjustable relative to the machine bed 1. The chuck 14 is axially yieldable relative to the gripping head 16.

To enable the performance of the milling process according to the invention, the center distance between the two supports 9, 10 of the stay 4 equals the center distance between the mainshaft portions of the crankshaft 11, and the two longitudinal carriages 2, 3 are coupled to the stay 4 in such a manner that the center distance between the milling tool 7 and the support 9 and the center distance between the milling tool 8 and the support 10 equal the center distance between a crankpin 13 and an adjacent mainshaft portion 12 of the crankshaft 11. As a result, the crankshaft 11 is milled always at two crankpins 13 at the same time and is supported at two mainshafts portions 12 which are adjacent to and disposed between said crankpins whereas the crankpin disposed between these mainshaft portions and between the crankpins being milled is left free. As a result, adequate space is available for a satisfactory stay 4 and the crankshaft is supported at portions which directly adjoin the portions being machined.

What is claimed is:

1. A machine for milling crankpins of a multiple-throw crankshaft having two ends and comprised of alternating mainshaft portions and crankpins between the two ends, including three axially consecutive crankpins and two axially consecutive mainshaft portions connecting the three crankpins, which comprises the combination of
    (a) a machine bed extending in a longitudinal direction,
    (b) gripping means on the machine bed for gripping the crankshaft at the two ends and positioning the crankshaft with its axis extending in the longitudinal direction,
    (c) two longitudinal carriages mounted on the machine bed between the gripping means for relative movement to the machine bed in the longitudinal direction, the carriages defining a gap therebetween and the carriages permitting the crankshaft to pass therethrough,
    (d) a tool carriage mounted on each one of the longitudinal carriages for relative movement thereto in a direction transverse to the longitudinal direction, the tool carriages permitting the crankshaft to pass therethrough,
    (e) a stay mounted on the machine bed in said gap for relative movement to the machine bed in the longitudinal direction, the stay carrying
        (1) two supports spaced apart in the longitudinal direction for radially engaging and supporting two axially consecutive mainshaft portions extending through the gap, and
    (f) an annular milling tool carried by each one of the tool carriages and having radially inwardly directed cutting teeth operable to mill a respective one of the three axially consecutive crankpins extending from a respective one of the supported mainshaft portions towards a respective end of the crankshaft.

2. The milling machine of claim 1, for milling the crankpins of a crankshaft wherein each one of the mainshaft portions has an axial length at least equal to the axial lengths of the crankpins, axially consecutive crankpins and mainshaft portions having a predetermined center distance, and axially consecutive mainshaft portions having a predetermined center distance, wherein the two supports have a center distance equal to the center distance between two axially consecutive mainshaft portions, and each milling tool and the support adjacent thereto have a center distance equal to the center distances between an axially consecutive crankpin and mainshaft portion.

* * * * *